(12) United States Patent
Yoshida et al.

(10) Patent No.: US 10,361,464 B2
(45) Date of Patent: Jul. 23, 2019

(54) ELECTROLYTIC SOLUTION AND SECONDARY BATTERY

(71) Applicant: NEC Corporation, Tokyo (JP)

(72) Inventors: Noboru Yoshida, Tokyo (JP); Ikiko Shimanuki, Tokyo (JP); Shinsaku Saitho, Tokyo (JP); Hitoshi Ishikawa, Tokyo (JP)

(73) Assignee: NEC Corporation, Tokyo (JP)

( * ) Notice: Subject to any disclaimer, the term of this patent is extended or adjusted under 35 U.S.C. 154(b) by 26 days.

(21) Appl. No.: 15/319,345

(22) PCT Filed: Jun. 16, 2015

(86) PCT No.: PCT/JP2015/067337
§ 371 (c)(1),
(2) Date: Dec. 15, 2016

(87) PCT Pub. No.: WO2015/194560
PCT Pub. Date: Dec. 23, 2015

(65) Prior Publication Data
US 2017/0149097 A1      May 25, 2017

(30) Foreign Application Priority Data
Jun. 16, 2014   (JP) ................. 2014-123706

(51) Int. Cl.
*H01M 10/42*     (2006.01)
*H01M 10/0525*   (2010.01)
(Continued)

(52) U.S. Cl.
CPC ....... *H01M 10/4235* (2013.01); *H01M 4/505* (2013.01); *H01M 4/525* (2013.01);
(Continued)

(58) Field of Classification Search
None
See application file for complete search history.

(56) References Cited

U.S. PATENT DOCUMENTS

2005/0170257 A1   8/2005   Kim et al.
2007/0015062 A1   1/2007   Lee et al.
(Continued)

FOREIGN PATENT DOCUMENTS

CN    101213702    7/2008
CN    101510594    8/2009
(Continued)

OTHER PUBLICATIONS

Machine Translation of JPH01-134873 (Year: 1989).*
(Continued)

*Primary Examiner* — Wyatt P McConnell
(74) *Attorney, Agent, or Firm* — Finnegan, Henderson, Farabow, Garrett & Dunner, L.L.P.

(57) ABSTRACT

The present invention relates to an electrolytic solution comprising a cyclic dicarboxylic acid ester represented by the specific formula, and the secondary battery comprising the same. According to the present invention, the electrolytic solution comprising an additive which can improve a characteristics in a secondary battery and a secondary battery comprising the same can be provided.

10 Claims, 2 Drawing Sheets

(51) Int. Cl.

| | | |
|---|---|---|
| *H01M 10/0567* | (2010.01) | |
| *H01M 10/0568* | (2010.01) | |
| *H01M 10/0569* | (2010.01) | |
| *H01M 4/505* | (2010.01) | |
| *H01M 4/525* | (2010.01) | |
| *H01M 4/587* | (2010.01) | |

(52) U.S. Cl.
CPC ....... *H01M 4/587* (2013.01); *H01M 10/0525* (2013.01); *H01M 10/0567* (2013.01); *H01M 10/0568* (2013.01); *H01M 10/0569* (2013.01); *H01M 2300/0037* (2013.01); *Y02T 10/7011* (2013.01)

(56) References Cited

U.S. PATENT DOCUMENTS

| | | | | |
|---|---|---|---|---|
| 2009/0208835 | A1* | 8/2009 | Horiuchi | H01M 2/0202 429/156 |
| 2009/0239154 | A1 | 9/2009 | Lee et al. | |
| 2011/0159378 | A1 | 6/2011 | Lee et al. | |
| 2012/0202120 | A1* | 8/2012 | Kim | B82Y 30/00 429/231.1 |

FOREIGN PATENT DOCUMENTS

| | | | |
|---|---|---|---|
| JP | 62-290069 | | 12/1987 |
| JP | 1-134873 | | 5/1989 |
| JP | H01134873 | * | 5/1989 |
| JP | 5-82168 | | 4/1993 |
| JP | 8-96849 | | 4/1996 |
| JP | 9-147910 | | 6/1997 |
| JP | 2002-75439 | | 3/2002 |
| JP | 2005-222947 | | 8/2005 |
| JP | 2005-317403 | | 11/2005 |
| JP | 2005317403 | * | 11/2005 |
| JP | 2015-103360 | | 6/2015 |
| JP | 2015-103361 | | 6/2015 |
| WO | WO 2007/004813 A1 | | 1/2007 |
| WO | WO 2008/023951 A1 | | 2/2008 |

OTHER PUBLICATIONS

Machine Translation of JP2005-317403 (Year: 2005).*
International Search Report and Written Opinion dated Sep. 8, 2015, in corresponding PCT International Application.
Notification of First Office Action dated May 28, 2018, in corresponding in corresponding Chinese Patent Application No. 201580031946.7.

* cited by examiner

ELECTROLYTIC SOLUTION AND SECONDARY BATTERY

CROSS-REFERENCE TO RELATED PATENT APPLICATIONS

This application is a National Stage Entry of International Application No. PCT/JP2015/067337, filed Jun. 16, 2015, which claims priority from Japanese Patent Application No. 2014-123706, filed Jun. 16, 2014. The entire contents of the above-referenced applications are expressly incorporated herein by reference.

TECHNICAL FIELD

The present invention relates to an electrolytic solution and a secondary battery comprising the electrolytic solution. Particularly, by using a specific nonaqueous electrolytic solution, a nonaqueous electrolytic solution secondary battery, preferably a lithium ion secondary battery having excellent cycle characteristics is provided.

BACKGROUND ART

With the rapid expansion of markets for notebook computers, cellular phones, electric vehicles, and the like, secondary batteries having excellent performance are required, and electrolytic solutions comprising various additives in order to improve the performance of secondary batteries are developed.

Patent Literature 1 discloses a nonaqueous electrolytic solution comprising a supporting salt, a nonaqueous solvent, and a monocarboxylic acid ester compound.

Patent Literature 2 discloses a nonaqueous electrolyte composition comprising a supporting salt, a nonaqueous solvent, and a open-chain aliphatic saturated dicarboxylic acid ester compound.

Patent Literature 3 discloses an electrolytic solution comprising a solvent, a supporting salt, a cyclic compound having at least two ketone groups (—C(=O)—) such as maleic anhydride, tetrahydrofuran-2,4-dione and succinic anhydride.

Patent Literature 4 discloses an electrolytic solution comprising an open-chain branched dicarboxylic acid ester represented by a predetermined formula.

Patent Literature 5 discloses an electrolytic solution comprising a six-membered to nine-membered cyclic organic compound having at least one oxycarbonyl group such as lactide.

CITATION LIST

Patent Literature

Patent Literature 1: Japanese Patent Laid-Open No. H9 (1997)-147910
Patent Literature 2: Japanese Patent Laid-Open No. H8 (1996)-96849
Patent Literature 3: Japanese Patent Laid-Open No. H5 (1993)-82168
Patent Literature 4: Japanese Patent Laid-Open No. 2002-075439
Patent Literature 5: Japanese Patent Laid-Open No. 2005-222947

SUMMARY OF INVENTION

Technical Problem

In Patent Literatures 1 to 5, electrolytic solutions containing various additives for the purpose of the improvement of the performance of secondary batteries are disclosed, but sufficient battery characteristics have not yet been obtained. The invention of the present application has been made in view of these circumstances, and it is an object of the invention of the present application to provide a lithium secondary battery having excellent cycle life.

The present invention relates to an electrolytic solution for a secondary battery comprising:
a nonaqueous solvent, and
at least one compound selected from the group consisting of a compound represented by the following formula (1) and a compound represented by the following formula (2); and
a secondary battery comprising the electrolytic solution.

(1)

wherein in the formula (1), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time and among carbon atoms contained in $R_1$ and $R_2$, all of carbon atoms constituting the ring are each bonded to at least one hydrogen atom,

(2)

wherein in the formula (2), $R_3$ and $R_4$ each independently represent a single bond or substituted or unsubstituted alkylene group having 1 to 5 carbon atoms that may be branched, with the proviso that both $R_3$ and $R_4$ do not represent single bonds at the same time and $R_3$ and $R_4$ are different groups.

Advantageous Effect of Invention

According to the present invention, an excellent lithium secondary battery having a high capacity retention ratio in a cycle test can be obtained.

DESCRIPTION OF EMBODIMENTS

[1] Nonaqueous Electrolytic Solution

Figure 1:
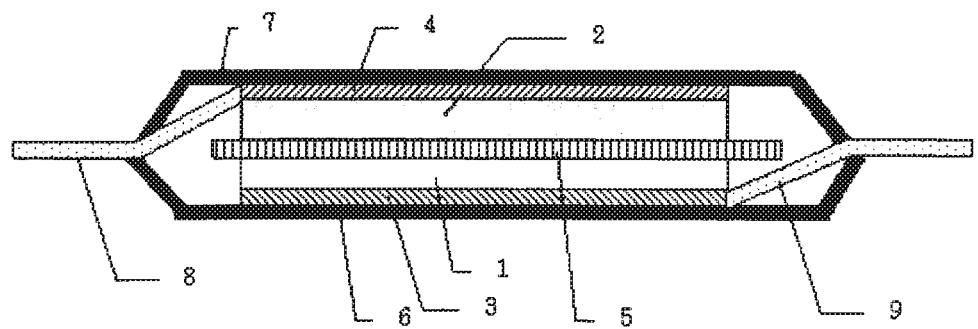
FIG. 1 is a schematic cross-sectional view of a secondary battery according to one embodiment of the present invention.

An electrolytic solution for a secondary battery of the invention of the present application comprises a nonaqueous solvent, at least one compound selected from the group consisting of a compound represented by the following formula (1) and a compound represented by the following formula (2), and further, an electrolyte is preferably dissolved in the nonaqueous solvent. Here, in the present specification, a compound represented by the formula (1) may be simply referred to as a compound (1) or a cyclic dicarboxylic acid ester compound (1), and a compound represented by the formula (2) may be simply referred to as a compound (2) or a cyclic dicarboxylic acid ester compound (2).

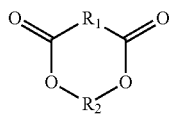

(1)

wherein in the formula (1), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time and among carbon atoms contained in $R_1$ and $R_2$, all of carbon atoms constituting the ring are each bonded to at least one hydrogen atom,

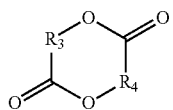

(2)

wherein in the formula (2), $R_3$ and $R_4$ each independently represent a single bond or substituted or unsubstituted alkylene group having 1 to 5 carbon atoms that may be branched, with the proviso that both $R_3$ and $R_4$ do not represent single bonds at the same time and $R_3$ and $R_4$ are different groups.

The cyclic dicarboxylic acid ester (which is a cyclic compound having two —C(=O)O— bonds) contained in a nonaqueous electrolytic solution is decomposed by electrochemical oxidation-reduction reactions during charge and discharge reactions to form films on surfaces of electrode active materials, thereby being able to suppress the decomposition of the electrolytic solution and the supporting salt. It is considered that this is effective in achieving a longer life of a lithium ion secondary battery. The present inventors have diligently studied, in more detail, a lithium ion secondary battery comprising a nonaqueous electrolytic solution comprising a dicarboxylic acid ester. As a result, the present inventors have found that when a nonaqueous electrolytic solution comprising a cyclic dicarboxylic acid ester represented by the formula (1) or the formula (2) is used, the characteristics of the lithium ion secondary battery improve remarkably, arriving at the present invention.

As described above, in the present embodiment, the nonaqueous electrolytic solution comprises the cyclic dicarboxylic acid ester compound having two —C(=O)O— bonds in the molecule as an additive. It is considered that the cyclic dicarboxylic acid ester compound has two —C(=O)O— bonds in the molecule and thus has improved affinity for a negative electrode and is easily adsorbed. In addition, when the compound is decomposed to form a film, the film has high ion conductivity and low resistance. Furthermore, the compound has a ring structure and therefore can undergo ring-opening during decomposition and polymerize on a negative electrode, and does not easily come off the surface of the active material even if the expansion and shrinkage of the active material accompanying charge and discharge occurs, and thus the compound can form a stable film.

The compound represented by the formula (1) will be described below.

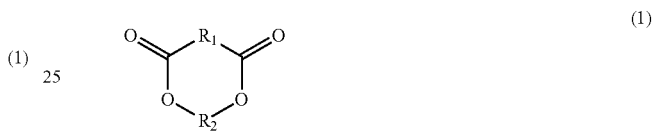

(1)

wherein in the formula (1), $R_1$ and $R_2$ each independently represent a single bond or substituted or unsubstituted alkylene group having 1 to 5 carbon atoms that may be branched, with the proviso that both $R_1$ and $R_2$ do not represent single bonds at the same time and among carbon atoms contained in $R_1$ and $R_2$, all of carbon atoms constituting the ring are each bonded to at least one hydrogen atom.

In the formula (1), $R_1$ and $R_2$ each independently represent a single bond or substituted or unsubstituted alkylene group having 1 to 5 carbon atoms, with the proviso that both $R_1$ and $R_2$ do not represent single bonds at the same time and among carbon atoms contained in $R_1$ and $R_2$, all of carbon atoms constituting the ring are each bonded to at least one hydrogen atom.

In the formula (1), the alkylene group may be either a straight chain or a branched chain. In the case of a straight chain, the alkylene group is represented by —$(CH_2)_n$— (n is an integer of 1 to 5) and is preferably represented by —$(CH_2)_n$— (n is an integer of 1 to 3).

The branched alkylene group is at least one hydrogen atom of the alkylene group represented by —$(CH_2)_n$— (n is an integer of 1 to 4) is substituted with an alkyl group, and among carbon atoms contained in $R_1$ and $R_2$, all of carbon atoms constituting the ring of the compound (1) are each bonded to at least one hydrogen atom (that is, it does not comprise a quaternary carbon atom.) The present inventors have found that when the compound in which among carbon atoms contained in $R_1$ and $R_2$, all of carbon atoms constituting the ring are each bonded to at least one hydrogen atom is used, the cycle characteristics of the lithium ion secondary battery is improved. The reason for this is considered that among carbon atoms contained in $R_1$ and $R_2$, all of carbon atoms constituting the ring are each bonded to at least one hydrogen atom, whereby the film forming ability on the surface of the electrode active material is improved and the effect of prolonging the life of the lithium ion secondary battery is enhanced as compared with using a compound having a carbon atom not bonding to a hydrogen atom (that is, having a quaternary carbon atom).

Examples of the branched alkylene group in the formula (1) include —CH($C_mH_{2m+1}$)— (m is an integer of 1 to 4), —CH$_2$—CH(CH$_3$)—, —CH$_2$—CH(C$_2$H$_5$)—, —CH$_2$—CH(C$_3$H$_7$)—, —CH(CH$_3$)—CH(CH$_3$)—, —CH(CH$_3$)CH$_2$CH$_2$—, —CH(CH$_3$)CH$_2$CH$_2$CH$_2$—, —CH[CH(CH$_3$)$_2$]— and —CH[C(CH$_3$)$_3$]—, and —CH($C_mH_{2m+1}$)— (m is an integer of 1 to 4), —CH$_2$—CH(CH$_3$)—, —CH(CH$_3$)—CH(CH$_3$)—, —CH(CH$_3$)CH$_2$CH$_2$—, and —CH(CH$_3$)CH$_2$CH$_2$CH$_2$— are preferred.

In addition, $R_1$ and $R_2$ each independently may have a substituent group, examples of the substituent group may include a halogen atom such as a fluorine atom, a chlorine atom, a bromine atom and the like, and a fluorine atom is preferable. For example, $R_1$ or $R_2$ is fluoroalkylene group having a fluorine atom, the fluoroalkylene group means that at least one hydrogen atom of the alkylene group is substituted with a fluorine atom and all hydrogen atoms may be substituted with a fluorine atom, and the substitution position and the substitution number of fluorine atoms are arbitrary.

In the formula (1), $R_1$ is preferably a single bond or a straight alkylene group, preferably a single bond, a methylene group or an ethylene group, and more preferably a single bond. $R_2$ is preferably a straight chain alkylene group or a branched chain alkylene group. In the case of a straight alkylene group, —(CH$_2$)$_n$— (n is an integer of 1 to 3) is preferable and an ethylene group is more preferable. In the case of a branched alkylene group, it preferably has a methyl group as an branched chain, and for example, —CH(CH$_3$)—, —CH$_2$—CH(CH$_3$)—, —CH(CH$_3$)—CH(CH$_3$)— are preferable.

In addition, in the formula (1), it is preferred that $R_1$ and $R_2$ are different each other because the compound (1) is easily decomposed and a film is easily formed on the surface of the electrode.

As one embodiment of the compound represented by the formula (1), a compound represented by the following formula (4) is preferable, a six-membered ring compound represented by the formula (6) is more preferable and a compound represented by the formula (7) is further preferable.

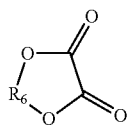
(4)

wherein in the formula (4), $R_6$ represents a substituted or unsubstituted alkylene group having 1 to 5 carbon atoms which may be branched, with the proviso that among carbon atoms contained in $R_6$, all of carbon atoms constituting the ring are each bonded to at least one hydrogen atom.

In the formula (4), $R_6$ preferably represents an unsubstituted alkylene group having 1 to 5 carbon atoms which may be branched, with the proviso that among carbon atoms contained in $R_6$, all of carbon atoms constituting the ring are each bonded to at least one hydrogen atom.

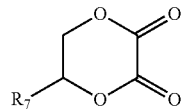
(6)

In the formula (6), $R_7$ represents a hydrogen atom or a substituted or unsubstituted alkyl group having 1 to 3 carbon atoms that may be branched.

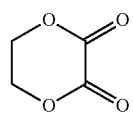
(7)

Next, the compound represented by the general formula (2) will be described.

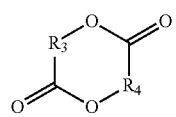
(2)

In the formula (2), $R_3$ and $R_4$ each independently represent a single bond or substituted or unsubstituted alkylene group having 1 to 5 carbon atoms that may be branched, with the proviso that both $R_3$ and $R_4$ do not represent single bonds at the same time and $R_3$ and $R_4$ are different groups.

In the formula (2), $R_3$ and $R_4$ each independently represent a single bond or substituted or unsubstituted alkylene group having 1 to 5 carbon atoms that may be branched, with the proviso that both $R_3$ and $R_4$ do not represent single bonds at the same time and $R_3$ and $R_4$ are different groups.

Since $R_3$ and $R_4$ are different groups, the compound is easily decomposed and easily to form a film on the surface of the electrode as compared with the case where $R_3$ and $R_4$ are the same groups.

In the formula (2), the alkylene group may be either a straight chain or a branched chain. In the case of a straight chain, the alkylene group is represented by —(CH$_2$)$_n$— (n is an integer of 1 to 5), is preferably represented by —(CH$_2$)$_n$— (n is an integer of 1 to 3) and is more preferably a methylene group. In the case of the branched alkylene group, it is at least one hydrogen atom of the alkylene group represented by —(CH$_2$)$_n$—(n is an integer of 1 to 4) is substituted with an alkyl group. Example of the branched alkylene group include —CH($C_mH_{2m+1}$)— (m is an integer of 1 to 4), —CH$_2$—CH(CH$_3$)—, —CH$_2$—CH(C$_2$H$_5$)—, —CH$_2$—CH(C$_3$H$_7$)—, —CH(CH$_3$)—CH(CH$_3$)—, —CH(CH$_3$)CH$_2$CH$_2$—, —CH(CH$_3$)CH$_2$CH$_2$CH$_2$—, —CH[CH(CH$_3$)$_2$]— and —CH[C(CH$_3$)$_3$]—, and —CH($C_mH_{2m+1}$)— (m is an integer of 1 to 3) is preferable.

In the compound represented by the formula (2), it is preferred that among carbon atoms contained in $R_3$ and $R_4$, all of carbon atoms constituting the ring are each bonded to at least one hydrogen atom. When the compound in which among carbon atoms contained in $R_3$ and $R_4$, all of carbon atoms constituting the ring are each bonded to at least one hydrogen atom is used, the cycle characteristics of the secondary battery is easily improved. The reason for this is considered that among carbon atoms contained in $R_3$ and $R_4$, all of carbon atoms constituting the ring are each bonded to at least one hydrogen atom, whereby the film forming ability on the surface of the electrode active material is improved and the effect of prolonging the life of the lithium ion secondary battery is enhanced as compared with using a compound having a carbon atom not bonding to a hydrogen atom (that is, having a quaternary carbon atom).

In addition, $R_3$ and $R_4$ may have each independently may have a substituent group, examples of the substituent group may include a halogen atom such as a fluorine atom, a chlorine atom, a bromine atom and the like, and a fluorine atom is preferable. For example, $R_3$ or $R_4$ is fluoroalkylene group having a fluorine atom, the fluoroalkylene group means that at least one hydrogen atom of the alkylene group is substituted with a fluorine atom and all hydrogen atoms may be substituted with a fluorine atom, and the substitution position and the substitution number of fluorine atoms are arbitrary.

In the formula (2), it is preferable that one of $R_3$ and $R_4$ is a single bond or a straight alkylene group and the other is a branched alkylene group, and it is more preferable that one is a single bond and the other is a branched alkylene group.

As the compound represented by the formula (2), a compound represented by the following general formula (3) is preferable and a compound represented by the following formula (5) is more preferable.

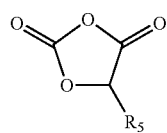

(3)

wherein in the formula (3), $R_5$ represents a hydrogen atom or a substituted or unsubstituted alkyl group having 1 to 4 carbon atoms.

In the formula (3), $R_5$ preferably represents a hydrogen atom or an unsubstituted alkyl group having 1 to 4 carbon atoms.

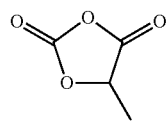

(5)

Examples of the cyclic dicarboxylic acid ester compound represented by the general formula (1) or (2) include the compounds shown in Table 1, but are not limited to these compounds. In the present specification, the compounds of No. 11 to No. 18 described in Table 1 may be respectively referred to as Compound No. 11 to Compound No. 18 simply.

TABLE 1

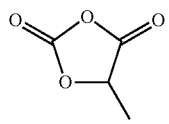

No. 11

TABLE 1-continued

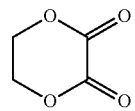

No. 12

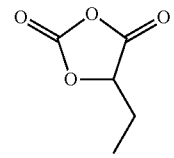

No. 13

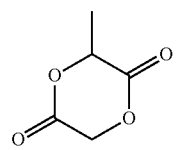

No. 14

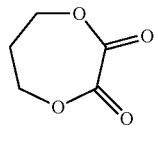

No. 15

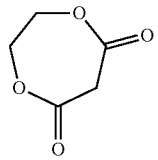

No. 16

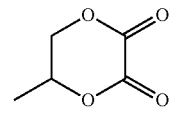

No. 17

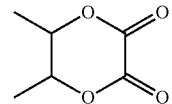

No. 18

In the present embodiment, the electrolytic solution preferably comprises Compound No. 11 and/or Compound No. 12.

Compound No. 11 and Compound No. 12 are novel compounds. The synthesis method of these compounds will be described later.

In the present embodiment, the nonaqueous electrolytic solution may comprise one of the compounds represented by the general formula (1) and the compound represented by the general formula (2) singly or combination of two or more.

In the present embodiment, the content of the dicarboxylic acid ester compound represented by the general formula (1) or the general formula (2) in the electrolytic solution is not particularly limited, but is preferably 0.1 to 10% by mass, more preferably 0.3 to 8.0% by mass and further preferably 0.5 to 5.0% by mass. When the content of the compounds in the present embodiment is 0.1% by mass or more, films can be effectively formed on an electrode, and as a result the decomposition of the nonaqueous solvent can be effectively suppressed. In addition, when the content of the compounds in the present embodiment is 10% by mass or less, an increase in the internal resistance of a battery due to excessive growth of an SEI film can be effectively suppressed.

Examples of a supporting salt used as an electrolyte include, but not limited to lithium salts such as $LiPF_6$, $LiAsF_6$, $LiAlCl_4$, $LiClO_4$, $LiBF_4$, $LiSbF_6$, $LiCF_3SO_3$, $LiC_4F_9SO_3$, $Li(CF_3SO_2)_2$, $LiN(CF_3SO_2)_2$ and the like. The supporting salts may be used singly or in combination of two or more types.

The concentration of the supporting salt in the electrolytic solution is preferably 0.5 to 1.5 mol/l. By setting the concentration of the support salt to the range, density, viscosity, electric conductivity and the like can be easily adjusted to the suitable range.

As the nonaqueous solvent, an aprotic solvent is preferred but the present invention is not limited to these. Examples of the nonaqueous solvent include carbonates such as cyclic carbonates and open-chain carbonates, aliphatic carboxylic acid esters, γ-lactones, cyclic ethers, open-chain ethers and fluorinated derivatives of these. These may be used singly or in combinations of two or more thereof. Here, in the present specification, the compounds represented by the formula (1) and the formula (2) are distinct from the nonaqueous solvent.

Examples of the cyclic carbonates include propylene carbonate (PC), ethylene carbonate (EC), butylene carbonate (BC) and vinylene carbonate (VC).

Examples of the open-chain carbonates include dimethyl carbonate (DMC), diethyl carbonate (DEC), ethyl methyl carbonate (EMC) and dipropyl carbonate (DPC).

Examples of the aliphatic monocarboxylic acid esters include methyl formate, methyl acetate and ethyl propionate.

Examples of the γ-lactones include γ-butyrolactone.

Examples of the cyclic ethers include tetrahydrofuran and 2-methyltetrahydrofuran.

Examples of the open-chain ethers include 1,2-diethoxyethane (DEE) and ethoxymethoxyethane (EME).

In addition, the following nonaqueous solvents are exemplified such as dimethyl sulfoxide, 1,3-dioxolane, formamide, acetamide, dimethylformamide, acetonitrile, propionitrile, nitromethane, ethyl monoglyme, phosphoric acid triester, trimethoxymethane, dioxolane derivatives, sulfolane, methylsulfolane, 1,3-dimethyl-2-imidazolidinone, 3-methyl-2-oxazolidinone, propylene carbonate derivatives, tetrahydrofuran derivatives, ethyl ether, N-methylpyrrolidone, fluorinated carboxylic acid ester, methyl-2,2,2-trifluoroethyl carbonate, methyl-2,2,3,3,3-pentafluoropropyl carbonate, trifluoromethyl ethylene carbonate, monofluoromethyl ethylene carbonate, difluoromethyl ethylene carbonate, 4,5-difluoro-1,3-dioxolan-2-one, monofluoroethyl carbonate. These may be used singly or in combinations of two or more thereof.

The nonaqueous solvent preferably comprises carbonates. The carbonates include cyclic carbonates or open-chain carbonates. Advantages of the carbonates are that the relative dielectric constant is large, and therefore the ion dissociation properties of the electrolytic solution improve, and further the viscosity of the electrolytic solution decreases, and therefore the ion mobility improves. But, when the carbonate having a carbonate structure is used as the nonaqueous solvent of the electrolytic solution, the carbonate tends to decompose to generate a gas comprising $CO_2$. Particularly in the case of a stacking laminate type secondary battery, when a gas is produced inside the battery, the problem of blistering emerges significantly, easily leading to performance decrease. Therefore, in the present embodiment, by adding the compounds in this embodiment to the nonaqueous solvent comprising the carbonate, an SEI film formed from the compounds in this embodiment can suppress the decomposition of the carbonate and suppress the generation of a gas. Therefore, in the present embodiment, the electrolytic solution preferably comprises the carbonate as the nonaqueous solvent, in addition to the compounds in this embodiment. By such an arrangement, even if the carbonate is used as the nonaqueous solvent, gas generation can be reduced, and a secondary battery having high performance can be provided. The content of the carbonate in the electrolytic solution is, for example, 30% by volume or more, preferably 50% by volume or more, and more preferably 70% by volume or more.

[2] Negative Electrode

The secondary battery of the present embodiment comprises a negative electrode comprising a negative electrode active material. The negative electrode active material can be bound on the negative electrode current collector by a negative electrode binder.

For example, the negative electrode in the present embodiment can be arranged to have a negative electrode current collector formed of a metal foil, and a negative electrode active material layer applied to one surface or both surfaces of the negative electrode current collector. The negative electrode active material layer is formed so as to cover the negative electrode current collector by a binder for a negative electrode. The negative electrode current collector is arranged to have an extended portion connected to a negative electrode terminal, and the negative electrode active material layer is not applied to this extended portion.

Examples of the negative electrode active material include lithium metal, a metal (a) that can be alloyed with lithium, a metal oxide (b) that can absorb and desorb a lithium ion, and a carbon material (c) that can absorb and desorb a lithium ion, but the present invention is not limited to these. The negative electrode active materials may be used singly or in combination of two or more.

As the metal (a), Al, Si, Pb, Sn, In, Bi, Ag, Ba, Ca, Hg, Pd, Pt, Te, Zn, La, or an alloy containing two or more of these may be exemplified. Alternatively, it may be used by mixing two or more of these metals and alloys. These metals and alloys may comprise one or more non-metal elements. Among these, as the negative electrode active material, it is preferable to use silicon, tin, or alloy thereof. By using silicon or tin as the negative electrode active material, a lithium secondary battery which is excellent in weight energy density and volume energy density can be provided.

Examples of the metal oxide (b) include silicon oxide, aluminum oxide, tin oxide, indium oxide, zinc oxide, lithium oxide, or a composite thereof. Among these, silicon oxide as the negative electrode active material is preferably used. Moreover, the metal oxide (b) may contain one or two or more elements selected from nitrogen, boron and sulfur in amounts of, for example, 0.1 to 5 mass %.

Examples of the carbon material (c) include graphite, amorphous carbon, diamond-like carbon, a carbon nanotube, or a composite thereof.

Examples of the negative electrode binder include, but not limited to polyvinylidene fluoride, vinylidene fluoride-hexafluoropropylene copolymer, vinylidene fluoride-tetrafluoroethylene copolymer, styrene-butadiene copolymer rubber, polytetrafluoroethylene, polypropylene, polyethylene, polyimide, polyamideimide and polyacrylic acid. Among these, polyvinylidene fluoride or styrene-butadiene copolymer rubber is preferable from the view point of high binding force. The content of the negative electrode binder to 100 parts by mass of the negative electrode active material is preferably in the range of 0.5 to 25 parts by mass, more preferably 1 to 8 parts by mass, and more preferably 1 to 5 parts by mass.

As a negative electrode current collector, in view of electrochemical stability, aluminum, nickel, stainless-steel, chrome, copper, silver, and an alloy thereof are preferable. Examples of its shape include foil, plate-like and mesh-like.

The negative electrode can be produced by forming a negative electrode active material layer comprising the negative electrode active material and the negative electrode binder on the negative electrode current collector. Examples of the method for forming the negative electrode active material layer include a doctor blade method, a die coater method, a CVD method, and a sputtering method. The negative electrode may also be produced by forming the negative electrode active material layer in advance, and then forming a thin film made of aluminum, nickel, or an alloy thereof on the negative electrode active layer by a method such as vapor deposition or sputtering.

[3] Positive Electrode

The secondary battery of the present embodiment comprises a positive electrode comprising a positive electrode active material. The positive electrode active material can be bound on the positive electrode current collector by a positive electrode binder.

For example, the positive electrode in the present embodiment can be arranged to have a positive electrode current collector formed of a metal foil, and a positive electrode active material layer applied to one surface or both surfaces of the positive electrode current collector. The positive electrode active material layer is formed so as to cover the positive electrode current collector by a binder for a positive electrode. The positive electrode current collector is arranged to have an extended portion connected to a positive electrode terminal, and the positive electrode active material layer is not applied to this extended portion.

Although the invention of the present application is not particularly limited, as the positive electrode active material, lithium-containing composite oxides that can absorb and desorb lithium are preferred, and examples of the lithium-containing composite oxides include lithium manganate having a layered structure or lithium manganate having a spinel structure such as $LiMnO_2$ or $Li_xMn_2O_4$ ($0<x<2$), or those in which a part of the Mn of these lithium manganates is replaced by at least one element selected from the group consisting of Li, Mg, Al, Co, B, Ti, and Zn; lithium cobaltate such as $LiCoO_2$, or those in which a part of the Co of lithium cobaltate is replaced by at least one element selected from the group consisting of Ni, Al, Mn, Mg, Zr, Ti, and Zn; lithium nickelate such as $LiNiO_2$, or those in which a part of the Ni of lithium nickelate is replaced by at least one element selected from the group consisting of Co, Al, Mn, Mg, Zr, Ti, and Zn; lithium transition metal oxides in which particular transition metals do not exceed half, such as $LiNi_{1/3}Co_{1/3}Mn_{1/3}O_2$, or those in which a part of the transition metals of the lithium transition metal oxides are replaced by at least one element selected from the group consisting of Co, Al, Mn, Mg, and Zr; and these lithium transition metal oxides in which Li is excessive as compared with the stoichiometric composition. Particularly, as the lithium composite oxides, $Li_\alpha Ni_\beta Co_\gamma Al_\delta O_2$ ($1 \le \alpha \le 1.2$, $\beta+\gamma+\delta=1$, $\beta \ge 0.7$, and $\gamma \le 0.2$), $Li_\alpha Ni_\beta Co_\gamma Mn_\delta O_2$ ($1 \le \alpha \le 1.2$, $\beta+\gamma+\delta=1$, $\beta \ge 0.5$, and $\gamma \le 0.4$), or those in which a part of the transition metals of these composite oxides are replaced by at least one element selected from the group consisting of Al, Mg, and Zr are preferred. One of these lithium composite oxides may be used alone, or two or more of these lithium composite oxides may be used in combination.

Among them, from the viewpoint of achieving higher energy density, a high capacity compound is preferably contained. Examples of the high capacity compound include lithium acid nickel ($LiNiO_2$), or lithium nickel composite oxides in which a part of the Ni of lithium acid nickel is replaced by another metal element, and layered lithium nickel composite oxides represented by the following formula (A) are preferred.

$$Li_y Ni_{(1-x)} M_x O_2 \tag{A}$$

wherein $0 \le x < 1$, $0 < y \le 1.2$, and M is at least one element selected from the group consisting of Co, Al, Mn, Fe, Ti, and B.

From the viewpoint of thermal stability, it is also preferred that the content of Ni does not exceed 0.5, that is, x is 0.5 or more in the formula (A). In addition, it is also preferred that particular transition metals do not exceed half. Examples of such compounds include $Li_\alpha Ni_\beta Co_\gamma MnO_2$ ($0 < \alpha \le 1.2$, preferably $1 \le \alpha \le 1.2$, $\beta+\gamma+\delta=1$, $0.2 \le \beta \le 0.5$, $0.1 \le \gamma \le 0.4$, and $0.1 \le \delta \le 0.4$). More specific examples may include $LiNi_{0.4}Co_{0.3}Mn_{0.3}O_2$ (abbreviated as NCM433), $LiNi_{1/3}Co_{1/3}Mn_{1/3}O_2$, $LiNi_{0.5}Co_{0.2}Mn_{0.3}O_2$ (abbreviated as NCM523), and $LiNi_{0.5}Co_{0.3}Mn_{0.2}O_2$ (abbreviated as NCM532) (also including these compounds in which the content of each transition metal fluctuates by about 10%).

In addition, from the viewpoint of high capacity, it is preferred that the content of Ni is high, that is, x is less than 0.5, further preferably 0.4 or less in the formula (A). Examples of such compounds include $Li_\alpha Ni_\beta Co_\gamma MnO_2$ ($0 < \alpha \le 1.2$, preferably $1 \le \alpha \le 1.2$, $\beta+\gamma+\delta=1$, $\beta \le 0.7$, and $\gamma \le 0.2$) and $Li_\alpha Ni_\beta Co_\gamma Al_\delta O_2$ ($0 < \alpha \le 1.2$, preferably $1 \le \alpha \le 1.2$, $\beta+\gamma+\delta=1$, $\beta \ge 0.7$, and $\gamma \le 0.2$) and particularly include $LiNi_\beta Co_\gamma Mn_\delta O_2$ ($0.75 \le \beta \le 0.85$, $0.05 \le \gamma \le 0.15$, and $0.10 \le \delta \le 0.20$). More specifically, for example, $LiNi_{0.8}Co_{0.05}Mn_{0.15}O_2$, $LiNi_{0.8}Co_{0.1}Mn_{0.1}O_2$, $LiNi_{0.5}Co_{0.15}Al_{0.05}O_2$, and $LiNi_{0.5}Co_{0.1}Al_{0.1}O_2$ may be preferably used.

In addition, two or more compounds represented by the formula (A) may be mixed and used, and, for example, it is also preferred that NCM532 or NCM523 and NCM433 are mixed in the range of 9:1 to 1:9 (as a typical example, 2:1) and used. Further, by mixing a material in which the content of Ni is high (x is 0.4 or less in the formula (A)) and a material in which the content of Ni does not exceed 0.5 (x is 0.5 or more, for example, NCM433), a battery having high capacity and high thermal stability can also be formed.

In addition, as the positive electrode active material, active materials that operate at a potential of 4.5 V or more versus lithium (hereinafter also referred to as 5 V class active materials) can be used from the viewpoint that high voltage is obtained.

As the 5 V class active materials, for example, lithium manganese composite oxides represented by the following formula (A) may be used.

$$Li_a(M_xMn_{2-x-y}Y_y)(O_{4-w}Z_w) \tag{A}$$

wherein in the formula (A), $0.4 \le x \le 1.2$, $0 \le y$, $x+y<2$, $0 \le a \le 1.2$, and $0 \le w \le 1$; M is at least one selected from the group consisting of Co, Ni, Fe, Cr, and Cu; Y is at least one selected from the group consisting of Li, B, Na, Mg, Al, Ti, Si, K, and Ca; and Z is at least one selected from the group consisting of F and Cl.

In addition, as the 5 V class active materials, among such metal composite oxides, spinel type compounds represented by the following formula (B) are preferably used from the viewpoint of obtaining sufficient capacity and achieving longer life.

$$LiNi_xMn_{2-x-y}A_yO_4 \tag{B}$$

wherein in the formula (B), 0.4<x<0.6, 0≤y<0.3, and A is at least one selected from the group consisting of Li, B, Na, Mg, Al, Ti, and Si.

In the formula (B), 0≤y<0.2 is more preferred.

Examples of these compounds include $Li_xMn_{1.5}Ni_{0.5}O_4$ (0<x<2).

In addition, examples of the active materials that operate at a potential of 4.5 V or more versus lithium include Si composite oxides. Examples of such Si composite oxides include compounds represented by the following formula (C):

$$Li_2MSiO_4 \quad (C)$$

wherein in the formula (C), M is at least one selected from the group consisting of Mn, Fe, and Co.

In addition, the active materials that operate at a potential of 4.5 V or more versus lithium may comprise layered structures. Examples of the 5 V class active materials comprising layered structures include compounds represented by the following formula (D):

$$Li(M1_xM2_yMn_{1-x-y})O_2 \quad (D)$$

wherein in the formula (D), M1 is at least one selected from the group consisting of Ni, Co, and Fe; and M2 is at least one selected from the group consisting of Li, Mg, and Al, 0.1<x<0.5, and 0.05<y<0.3.

As the 5 V class active materials, lithium metal composite oxides represented by the following (E) to (G) may be used.

$$LiMPO_4 \quad (E)$$

wherein in the formula (E), M is at least one selected from the group consisting of Co and Ni.

Examples of the olivine type 5 V active materials represented by the formula (E) include $LiCoPO_4$ or $LiNiPO_4$.

$$Li(M_yMn_z)O_2 \quad (F)$$

wherein in the formula (F), 0.1≤y≤0.67, preferably y≤0.5, 0.33≤z≤0.9, preferably z≤0.7, y+z=1, and M is at least one selected from the group consisting of Li, Co, and Ni.

$$Li(Li_xM_yMn_z)O_2 \quad (G)$$

wherein in the formula (G), 0.1≤x<0.3, 0.1≤y≤0.4, 0.33≤z≤0.7, x+y+z=1, and M is at least one selected from the group consisting of Li, Co, and Ni.

All the above-described positive electrode active materials may be used alone or in combinations of two or more.

As the positive electrode binder, the same materials as mentioned for the negative electrode binder can be used. Among them, polyvinylidene fluoride is preferred from the viewpoint of versatility and low cost. The amount of the positive electrode binder is preferably 2 to 10 parts by mass based on 100 parts by mass of the positive electrode active material.

As the positive electrode current collector, the same materials as mentioned for the negative electrode current collector may be used.

A conductive auxiliary material may be added to the positive electrode active material layer comprising the positive electrode active material for the purpose of decreasing impedance. Examples of the conductive auxiliary material include carbonaceous fine particles such as graphite, carbon black, and acetylene black.

[4] Separator

As a separator, porous films or non-woven fabrics formed of polypropylene, polyethylene, or the like may be used, but the present invention is not particularly limited to these. In addition, these may be stacked and used as a separator.

Examples of the separator that can be used include webs and sheets formed of organic materials, for example, woven fabrics and nonwoven fabrics of polyamides, polyimides, cellulose and the like, porous polymer films of polyolefines such as polyethylene and polypropylene, polyamides, polyimides, porous polyvinylidene fluoride and the like or ion-conducting polymer electrolyte membrane or the like. These may be used alone or in combination.

Further, as a separator, it is also possible to use a separator formed of an inorganic material such as ceramic or glass. The examples of inorganic separators include:

nonwoven fabric separators formed of ceramic short fibers such as alumina, alumina-silica, potassium titanate, and the like;

separators comprising a substrate of a woven fabric, a nonwoven fabric or a porous film, and a layer containing a heat-resistant nitrogen-containing aromatic polymer and a ceramic powder;

porous thin film layer separators in which a heat-resistant layer is provided on a part of the surface, wherein the heat-resistant layer is formed of a porous thin layer containing ceramic powder, a porous thin layer of a heat-resistant resin, or a composite of ceramic powder and heat-resistant resin;

separators comprising a layer of a porous film in which secondary particles formed by sintering or dissolving-recrystallizing a part of primary particles of a ceramic material are bound by a binder;

separators comprising a substrate layer formed of a polyolefin porous film and a heat resistant insulating layer formed on one side or both sides of the base material layer, wherein the heat resistant insulating layer comprises an oxidation resistant ceramic particle and a heat resistant resin;

separators comprising a porous film formed by binding a ceramic material and a binder, wherein the ceramic material is selected from silica ($SiO_2$), alumina ($Al_2O_3$), zirconium oxide ($ZrO_2$), titanium oxide ($TiO_2$), nitrides of silicon (Si), hydroxides of aluminum (Al), alkoxides of zirconium (Zr) and ketone compounds of titanium (Ti); and separators comprising a polymer substrate and a ceramic-containing coating layer of $Al_2O_3$, MgO, $TiO_2$, $Al(OH)_3$, $Mg(OH)_2$, $Ti(OH)_4$ formed on the polymer substrate; and the like.

[5] Package

The package is not particularly limited but, for example, a laminate film may be used. For example, in the case of a stacked laminate type secondary battery, a laminate film made of polypropylene, polyethylene, or the like, coated with aluminum or silica, may be used.

In the case of a secondary battery using a laminate film as a package, when a gas is generated, the strain of the electrode stack is very large compared with a secondary battery using a metal can as a package. This is because the laminate film deforms easily by the internal pressure of the secondary battery compared with the metal can. Further, when the secondary battery using the laminate film as the package is sealed, usually, the battery internal pressure is set lower than atmospheric pressure, and therefore there is no extra space inside, and when a gas is generated, it easily immediately leads to the volume change of the battery and the deformation of the electrode stack. The secondary battery according to the present embodiment can overcome such problems, however, by using the electrolytic solution comprising the compounds in the present embodiment.

[6] Secondary Battery

Figure 2:
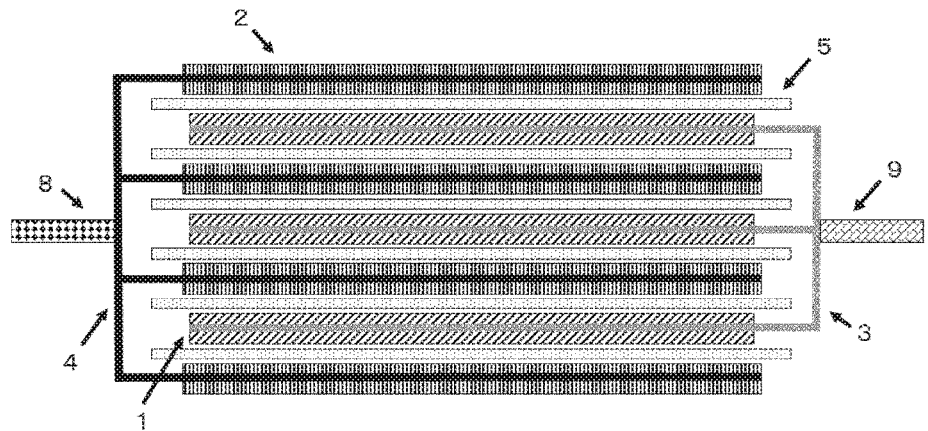
FIG. 2 is a schematic cross-sectional view showing the structure of the electrode stack of a stacking laminate type secondary battery.

A secondary battery (preferably a lithium ion secondary battery) using the nonaqueous electrolytic solution in the present embodiment has, for example, a structure as shown in FIG. 1. In the positive electrode, a layer 1 containing a positive electrode active material is formed on a positive electrode current collector 3, and in the negative electrode, a layer 2 containing a negative electrode active material is formed on a negative electrode current collector 4. These positive electrode and negative electrode are disposed so as to face each other with a porous separator 5 between them. The porous separator 5 is disposed generally parallel to the layer 2 containing the negative electrode active material. In the secondary battery, an electrode element (also described as a "battery element") in which these positive electrode and negative electrode are disposed so as to face each other and the electrolytic solution are contained in packages 6 and 7. A positive electrode tab 9 is connected to the positive electrode current collector 3, and a negative electrode tab 8 is connected to the negative electrode current collector 4, and these tabs are drawn out of the container. As shown in FIG. 2, the electrode element may have an arrangement in which a plurality of positive electrodes and a plurality of negative electrodes are stacked via separators. In addition, the positive electrode active material layer 1 and the negative electrode active material layer 2 may be provided on both surfaces of the current collectors respectively. The shape of the nonaqueous electrolytic solution secondary battery according to the present embodiment is not particularly limited, but examples of the shape include a laminate packaging type, a cylindrical type, a prismatic type, and a coin type.

Figure 3:
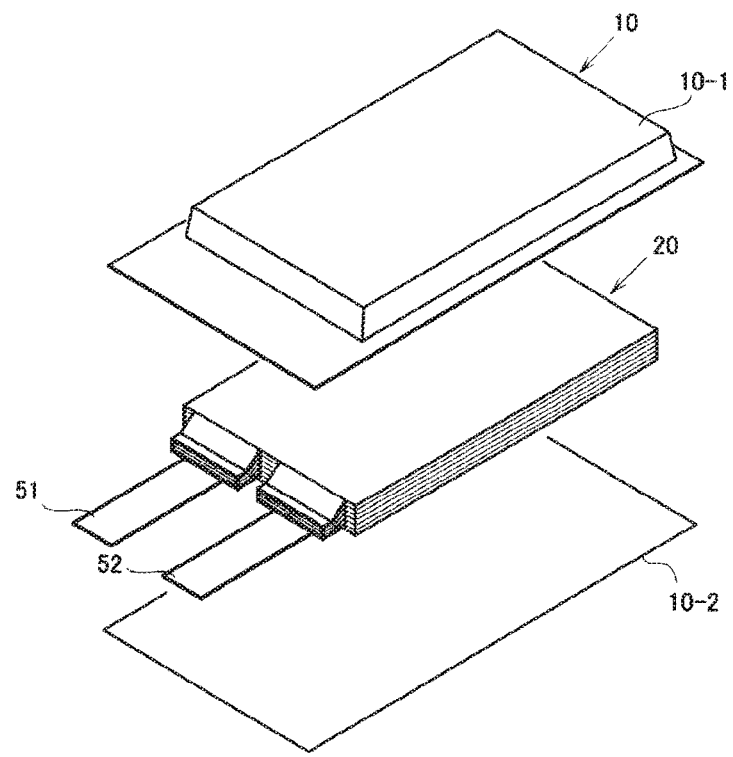
FIG. 3 is an exploded perspective view showing the basic structure of a film-packaged battery.
Figure 4:
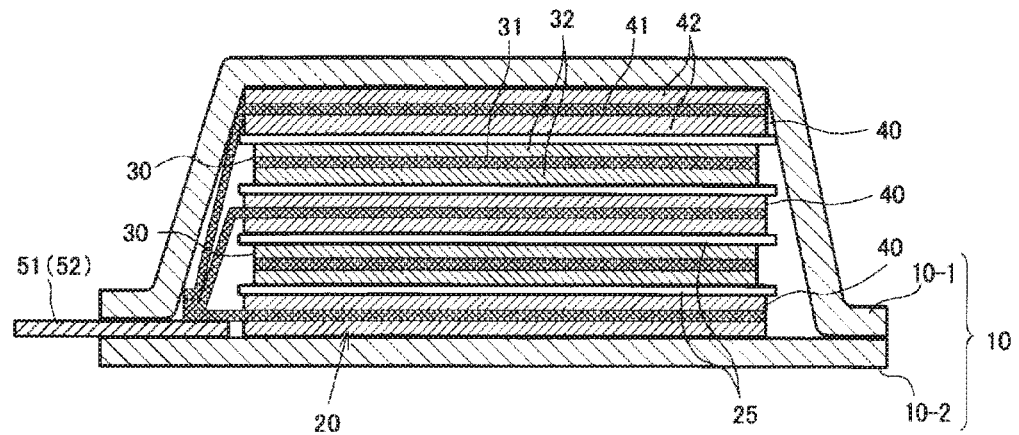
FIG. 4 is a cross-sectional view schematically showing a cross section of the battery in FIG. 3.

As another embodiment, a secondary battery having a structure as shown in FIG. 3 and FIG. 4 may be provided. This secondary battery comprises a battery element 20, a film package 10 housing the battery element 20 together with an electrolyte, and a positive electrode tab 51 and a negative electrode tab 52 (hereinafter these are also simply referred to as "electrode tabs").

In the battery element 20, a plurality of positive electrodes 30 and a plurality of negative electrodes 40 are alternately stacked with separators 25 sandwiched therebetween as shown in FIG. 4. In the positive electrode 30, an electrode material 32 is applied to both surfaces of a metal foil 31, and also in the negative electrode 40, an electrode material 42 is applied to both surfaces of a metal foil 41 in the same manner. The present invention is not necessarily limited to stacking type batteries and may also be applied to batteries such as a winding type.

In the secondary battery in FIG. 1, the electrode tabs are drawn out on both sides of the package, but a secondary battery to which the present invention may be applied may have an arrangement in which the electrode tabs are drawn out on one side of the package as shown in FIG. 3. Although detailed illustration is omitted, the metal foils of the positive electrodes and the negative electrodes each have an extended portion in part of the outer periphery. The extended portions of the negative electrode metal foils are brought together into one and connected to the negative electrode tab 52, and the extended portions of the positive electrode metal foils are brought together into one and connected to the positive electrode tab 51 (see FIG. 4). The portion in which the extended portions are brought together into one in the stacking direction in this manner is also referred to as a "current collecting portion" or the like.

The film package 10 is composed of two films 10-1 and 10-2 in this example. The films 10-1 and 10-2 are heat-sealed to each other in the peripheral portion of the battery element 20 and hermetically sealed. In FIG. 3, the positive electrode tab 51 and the negative electrode tab 52 are drawn out in the same direction from one short side of the film package 10 hermetically sealed in this manner.

Of course, the electrode tabs may be drawn out from different two sides respectively. In addition, regarding the arrangement of the films, in FIG. 3 and FIG. 4, an example in which a cup portion is formed in one film 10-1 and a cup portion is not formed in the other film 10-2 is shown, but other than this, an arrangement in which cup portions are formed in both films (not illustrated), an arrangement in which a cup portion is not formed in either film (not illustrated), and the like may also be adopted.

EXAMPLES

Hereinafter, the present embodiment will be described in more detail by means of Examples, but the present invention is not limited to these.

Example 1

(Fabrication of Electrodes)
  <Negative Electrode>
  As a negative electrode active material, graphite was used. This negative electrode active material, acetylene black as a conductive auxiliary material, and polyvinylidene fluoride as a negative electrode binder were measured at a mass ratio of 75:20:5. Then, these were mixed with N-methylpyrrolidone to prepare a negative electrode slurry. The negative electrode slurry was applied to a copper foil having a thickness of 10 μm followed by drying and further heat treatment at 120° C. under a nitrogen atmosphere to fabricate a negative electrode.
  <Positive Electrode>
  As a positive electrode active material, $Li(Ni_{0.5}Co_{0.2}Mn_{0.3})O_2$ was used. This positive electrode active material, carbon black as a conductive auxiliary material, and polyvinylidene fluoride as a positive electrode binder were measured at a mass ratio of 90:5:5. Then, these were mixed with N-methylpyrrolidone to prepare a positive electrode slurry. The positive electrode slurry was applied to an aluminum foil having a thickness of 20 μm followed by drying and further pressing to fabricate a positive electrode.
  <Electrode Stack>
  Three layers of the obtained positive electrodes and four layers of the negative electrodes were alternately superposed with polypropylene porous films as separators sandwiched therebetween. The ends of the positive electrode current collectors not covered with the positive electrode active material were welded, and the ends of the negative electrode current collectors not covered with the negative electrode active material were welded. Further, a positive electrode terminal made of aluminum and a negative electrode terminal made of nickel were welded to the welded parts respectively to obtain an electrode stack having a planar stacked structure.
  <Electrolytic Solution>
  A mixed solvent of EC (ethylene carbonate) and DEC (diethyl carbonate) (volume ratio: EC/DEC=30/70) was used as the solvent of a nonaqueous electrolytic solution, and $LiPF_6$ as a supporting electrolyte was dissolved at 1 M in the nonaqueous electrolytic solution.
  Compound No. 11 described in Table 1, as an additive, was added in amounts of 1.0% by weight in the nonaqueous electrolytic solution to prepare the nonaqueous electrolytic solution. A nonaqueous secondary battery was fabricated using this nonaqueous electrolytic solution, and a charge and discharge cycle test was performed for 200 cycles.

Compound No. 11 was synthesized by the following method. Under nitrogen atmosphere, a suspension of 76.23 g of lithium L-lactate in 560 ml of dehydrated tetrahydrofuran (THF) was cooled to −8° C. To this suspension, a solution of 158.36 g of triphosgene in 270 ml of dehydrated THF was added dropwise. Then, the mixture was stirred at room temperature for 3 hours. Tetrahydrofuran was distilled off under reduced pressure, and 1500 ml of diethyl ether was added. The precipitated solid was removed by filtration, and the filtrate was distilled off under reduced pressure. After seed crystals were added to the residue and solidified, 30 ml of t-butyl methyl ether was added, and the mixture was stirred while cooling in an ice water bath. Precipitated crystals were filtered, and the obtained crystals were heated and dissolved in t-butyl methyl ether, and left in a freezer overnight. Precipitated crystals were collected by filtering, washed with cooled t-butyl methyl ether, and dried to obtain the desired product.

<Secondary Battery>

The electrode stack was housed in an aluminum laminate film as a package, and the electrolytic solution was injected into the package. Then, while the pressure was reduced to 0.1 atmospheres, the package was sealed to fabricate a secondary battery.

<Evaluation>

(Capacity Retention Ratio at 45° C.)

The fabricated secondary battery was subjected to a test in which charge and discharge was repeated in the voltage range of 2.5 V to 4.2 V in a thermostat kept at 45° C., and evaluated for the cycle retention ratio (capacity retention ratio) (%). In the charge, the secondary battery was charged at 1 C to 4.2 V and then subjected to constant voltage charge for 2.5 hours in total. In the discharge, the secondary battery was subjected to constant current discharge at 1 C to 2.5 V.

The "capacity retention ratio (%)" was calculated by (discharge capacity after 200 cycles)/(discharge capacity after 1 cycle)×100 (unit: %). The results are shown in Table 2.

Example 2

A secondary battery was fabricated and evaluated as in Example 1 except that as an additive used in the nonaqueous electrolytic solution, Compound No. 12 described in Table 1 was used instead of No. 11. The results are shown in Table 2.

Compound No. 12 was synthesized by the following method. 20.0 g of ethylene glycol, 127.4 g of pyridine and 1600 ml of dehydrated THF were added to the reaction vessel, and after cooling to 5° C. or lower, 40 ml of a dehydrated THF solution in which 45.0 g of oxalyl dichloride was dissolved was added dropwise and the mixture was stirred for 2 hours. The reaction solution was filtered through Celite, the products remained on the filter was washed with dehydrated THF, and the filtrate was concentrated under reduced pressure. The residue was distilled with Kugelrohr, and a fraction of 100° C. to 160° C./20 Pa was collected, washed with chloroform/hexane (5 ml/5 ml) and dried under reduced pressure to obtain the desired product as colorless crystals.

Example 3

A secondary battery was fabricated and evaluated as in Example 1 except that as an additive used in the nonaqueous electrolytic solution, Compound No. 13 described in Table 1 was used instead of No. 11. The results are shown in Table 2.

Example 4

A secondary battery was fabricated and evaluated as in Example 1 except that as an additive used in the nonaqueous electrolytic solution, Compound No. 14 described in Table 1 was used instead of No. 11. The results are shown in Table 2.

Example 5

A secondary battery was fabricated and evaluated as in Example 1 except that as an additive used in the nonaqueous electrolytic solution, Compound No. 15 described in Table 1 was used instead of No. 11. The results are shown in Table 2.

Example 6

A secondary battery was fabricated and evaluated as in Example 1 except that as an additive used in the nonaqueous electrolytic solution, Compound No. 16 described in Table 1 was used instead of No. 11. The results are shown in Table 2.

Example 7

A secondary battery was fabricated and evaluated as in Example 1 except that as an additive used in the nonaqueous electrolytic solution, Compound No. 17 described in Table 1 was used instead of No. 11. The results are shown in Table 2.

Example 8

A secondary battery was fabricated and evaluated as in Example 1 except that as an additive used in the nonaqueous electrolytic solution, Compound No. 18 described in Table 1 was used instead of No. 11. The results are shown in Table 2.

Comparative Example 1

A secondary battery was fabricated and evaluated as in Example 1 except that as an additive used in the nonaqueous electrolytic solution, γ-butyrolactone (γ-BL) was used instead of No. 11. The results are shown in Table 2.

Comparative Example 2

A secondary battery was fabricated and evaluated as in Example 1 except that as an additive used in the nonaqueous electrolytic solution, dimethyl succinate was used instead of No. 11. The results are shown in Table 2.

Comparative Example 3

A secondary battery was fabricated and a charge and discharge cycle test was performed for 200 cycles as in Example 1 except that additives were not added to the nonaqueous electrolytic solution. The results are shown in Table 2.

Comparative Example 4

A secondary battery was fabricated and evaluated as in Example 1 except that as an additive used in the nonaqueous electrolytic solution, the following Compound No. 19 was used instead of No. 11. The results are shown in Table 2.

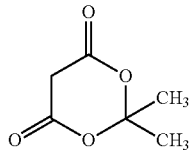

No. 19

Comparative Example 5

A secondary battery was fabricated and evaluated as in Example 1 except that as an additive used in the nonaqueous electrolytic solution, 1.0% by weight of 1,4-dioxane-2,5-dione in the electrolytic solution was used instead of No. 11. The results are shown in Table 2.

Comparative Example 6

A secondary battery was fabricated and evaluated as in Example 1 except that as an additive used in the nonaqueous electrolytic solution, 3,6-dimethyl-1,4-dioxane-2,5-dione was used instead of No. 11. The results are shown in Table 2.

TABLE 2

| | Additive | capacity retention ratio at 45° C. after 200 cycles (%) |
|---|---|---|
| Example 1 | No. 11 | 84.6 |
| Example 2 | No. 12 | 85.2 |
| Example 3 | No. 13 | 79.9 |
| Example 4 | No. 14 | 79.4 |
| Example 5 | No. 15 | 83.2 |
| Example 6 | No. 16 | 79.1 |
| Example 7 | No. 17 | 83.9 |
| Example 8 | No. 18 | 82.1 |
| Comparative Example 1 | γ-BL | 77.3 |
| Comparative Example 2 | dimethyl succinate | 77 |
| Comparative Example 3 | — | 75 |
| Comparative Example 4 | No. 19 | 78.2 |
| Comparative Example 5 | 1,4-dioxane-2,5-dione | 76.5 |
| Comparative Example 6 | 3,6-dimethyl-1,4-dioxane-2,5-dione | 76.7 |

In Table 2, the numbers of additives (No. 11 to 18) correspond to the numbers of the compounds in Table 1.

(Evaluation Results of Cycle Test)

As described above, lithium secondary batteries comprising a nonaqueous electrolytic solution obtained by adding $LiPF_6$ as a supporting electrolyte at 1 mol/L to a mixed solvent of EC and DEC (volume ratio: 30/70) as the solvent of the nonaqueous electrolytic solution and further adding the Compound No. 11 to No. 18 as additives were fabricated, and the cycle tests were performed using these (Examples 1 to 8). As objects to be compared, also for a case where γ-butyrolactone as a monocarboxylic acid ester was added to the nonaqueous electrolytic solution (Comparative Example 1), a case where dimethyl succinate as an open-chain dicarboxylic acid ester was added (Comparative Example 2), a case where no additive was added (Comparative Example 3), a case where Compound No. 19 having a carbon atom not bonded to hydrogen atom as a carbon atom constituting the ring was added (Comparative Example 4), and a case where the compound in which $R_3$ and $R_4$ in the formula (2) are the same groups was added (Comparative Examples 5,6), the cycle tests were performed at the same time.

From the results of Examples 1 to 8, it was confirmed that when the cyclic dicarboxylic acid ester was added to the nonaqueous electrolytic solution, a good capacity retention ratio was shown as compared with Comparative Examples 1 to 6. Particularly in Example 1 and Example 2, the capacity retention ratios were remarkably improved.

INDUSTRIAL APPLICABILITY

The present embodiment can be utilized in various industrial fields that require for a power supply and in an industrial field concerning transportation, storage and supply of electric energy. Specifically, it can be utilized for, for example, a power supply of a mobile device such as a mobile phone and a notebook computer; a power supply of a moving or transport medium such as a train, a satellite and a submarine, including an electric vehicle such as an electric car, a hybrid car, an electric motorcycle, and an electric power-assisted bicycle; a back-up power supply such as UPS; and a power storage device for storing an electric power generated by solar power generation, wind power generation, and the like.

EXPLANATION OF REFERENCE

1 positive electrode active material layer
2 negative electrode active material layer
3 positive electrode current collector
4 negative electrode current collector
5 porous separator
6 laminate package
7 laminate package
8 negative electrode tab
9 positive electrode tab
10 film package
20 battery element
25 separator
30 positive electrode
40 negative electrode

The invention claimed is:

1. An electrolytic solution for a secondary battery comprising:
   a nonaqueous solvent, and
   at least one compound selected from the group consisting of a compound represented by the following formula (4) and a compound represented by the following formula (5),

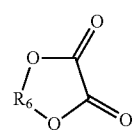

(4)

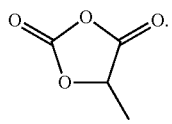

(5)

wherein in the formula (4), $R_6$ represents a substituted or unsubstituted alkylene group having 1 to 5 carbon atoms which may be branched.

2. The electrolytic solution for a secondary battery according to claim 1, wherein the compound represented by the formula (4) comprises a six-membered ring compound represented by the following formula (6):

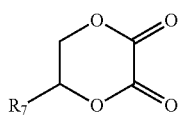

(6)

wherein in the formula (6), $R_7$ represents a hydrogen atom or a substituted or unsubstituted alkyl group having 1 to 3 carbon atoms that may be branched.

3. The electrolytic solution for a secondary battery according to claim 1, wherein the compound represented by the formula (4) comprises a compound represented by the following formula (7):

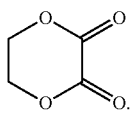

(7)

4. The electrolytic solution for a secondary battery according to claim 1, comprising a lithium salt as an electrolyte.

5. The electrolytic solution for a secondary battery according to claim 4, wherein the lithium salt is at least one lithium salt selected from the group consisting of $LiPF_6$, $LiBF_4$, $LiAsF_6$, $LiSbF_6$, $LiClO_4$, $LiAlCl_4$ and $LiN(C_kF_{2k+1}SO_2)(C_mF_{2m+1}SO_2)$ wherein k and m are each independently 1 or 2.

6. The electrolytic solution for a secondary battery according to claim 1, wherein the nonaqueous solvent is at least one organic solvent selected from the group consisting of cyclic carbonates, open-chain carbonates, aliphatic carboxylic acid esters, γ-lactones, cyclic ethers, open-chain ethers and fluorine derivatives of these compounds.

7. A secondary battery comprising a positive electrode, a negative electrode and an electrolytic solution for a secondary battery, wherein the electrolytic solution for a secondary battery is an electrolytic solution for a secondary battery according to claim 1.

8. The secondary battery according to claim 7, wherein the positive electrode comprises lithium-containing composite oxide capable of absorbing and desorbing lithium as a positive electrode active material.

9. The secondary battery according to claim 7, wherein the negative electrode comprises carbon as a negative electrode active material.

10. A method for producing an electrolytic solution for a secondary battery, comprising dissolving in a nonaqueous solvent, at least one compound selected from the group consisting of a compound represented by the following formula (4) and a compound represented by the following formula (2),

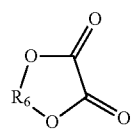

(4)

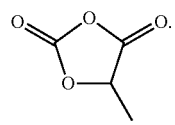

(5)

wherein in the formula (4), $R_6$ represents a substituted or unsubstituted alkylene group having 1 to 5 carbon atoms which may be branched.

\* \* \* \* \*